(12) United States Patent  
Walton

(10) Patent No.: US 6,311,059 B1  
(45) Date of Patent: Oct. 30, 2001

(54) MOBILE RADIO STATION

(75) Inventor: Mark James Walton, Reading (GB)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/245,307

(22) Filed: Feb. 5, 1999

(51) Int. Cl.[7] .............................. H04Q 7/20; H04Q 7/32; H04Q 7/34

(52) U.S. Cl. .................... 455/425; 455/441; 455/437; 455/574; 455/434; 455/515; 455/343; 455/423; 455/67.1; 455/226.1; 455/226.2; 370/337; 370/348; 370/347

(58) Field of Search ...................... 455/441, 437, 455/574, 434, 515, 343, 425, 423, 67.1, 226.1, 226.2; 370/337, 347, 348

(56) References Cited

U.S. PATENT DOCUMENTS

| | | | |
|---|---|---|---|
| 5,448,569 | * | 9/1995 | Huang et al. ........................ 455/441 |
| 5,711,005 | * | 1/1998 | Farrag .................................. 455/441 |
| 5,722,072 | * | 2/1998 | Crichton et al. ..................... 455/437 |
| 6,044,272 | * | 3/2000 | Kobylinski et al. ................. 455/437 |

FOREIGN PATENT DOCUMENTS 2 305 825    4/1997   (GB) .

* cited by examiner

Primary Examiner—William Trost  
Assistant Examiner—Keith Ferguson  
(74) Attorney, Agent, or Firm—Sughrue, Mion, Zinn, Macpeak & Seas, PLLC

(57) ABSTRACT

A mobile radio station for use in a mobile radio network in which the rate at which neighboring radio base stations are monitored can be reduced for power saving purposes without significantly degrading cell reselection performance. A reception field strength of a current cell and of signals transmitted from radio base stations neighboring the current cell. If the reception field strength of a current cell is less than a first threshold that has been previously determined, a rate of decrease of reception field strength of the current cell is determined. If the rate of decrease exceeds a second threshold, the reception field strengths of signals transmitted from a maximum number that previously determined of radio base stations from among neighboring radio base stations are measured. If the reception field strength of a current cell is over the first threshold or if the rate of decrease is under the second threshold, the reception field strengths of signals transmitted from a number of radio base stations less than the maximum number from among neighboring radio base station are measured.

22 Claims, 5 Drawing Sheets

MOBILE RADIO STATION

BACKGROUND OF THE INVENTION

1. Field of the Invention

The present invention relates to a mobile radio station such as a GSM (Global System for Mobile communication) mobile phone, and particularly to a radio base station monitoring control by the mobile radio station.

2. Description of the Related Art

In the GSM system, each radio base station reserves four TDMA frames every n multiframes as a paging channel. The value of n can be set for a particular radio base station to any value from 2 to 9. A single block of paging channel frames are long enough for the mobile radio station to listen to its current radio base station for any incoming call and to receive from two neighboring radio base stations in each frame and measure the signal strengths thereof. Thus the signal strength received from eight neighboring radio base stations can be monitored in every n multi-frame.

If two monitor operations are performed in every paging channel TDMA frame a considerable amount of power will be wasted, if the mobile radio station is, for example, at the center of a cell where it is unlikely that any hand-off to a neighboring radio base station will be required imminently.

On the other hand, although it is simple to arrange that fewer monitor operations are performed, this will have the effect of degrading cell reselection performance.

SUMMARY OF THE INVENTION

It is an object of the present invention to provide a mobile radio station for use in a mobile radio network in which the rate at which neighboring radio base stations are monitored can be reduced for power saving purposes without significantly degrading cell reselection performance.

The reception field strengths of a current cell and of signals transmitted from radio base stations neighboring the current cell are measured. If the reception field strength of a current cell is less than a first threshold that has been previously determined, a rate of decrease of reception field strength of the current cell is determined. If the rate of decrease exceeds a second threshold, reception field strengths of signals transmitted from a maximum number of previously determined radio base stations from among neighboring radio base stations are measured. If the reception field strength of a current cell is over the first threshold or if the rate of decrease is under the second threshold, the reception field strengths of signals transmitted from a number of radio base stations less than the maximum number from among neighboring radio base station are measured.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
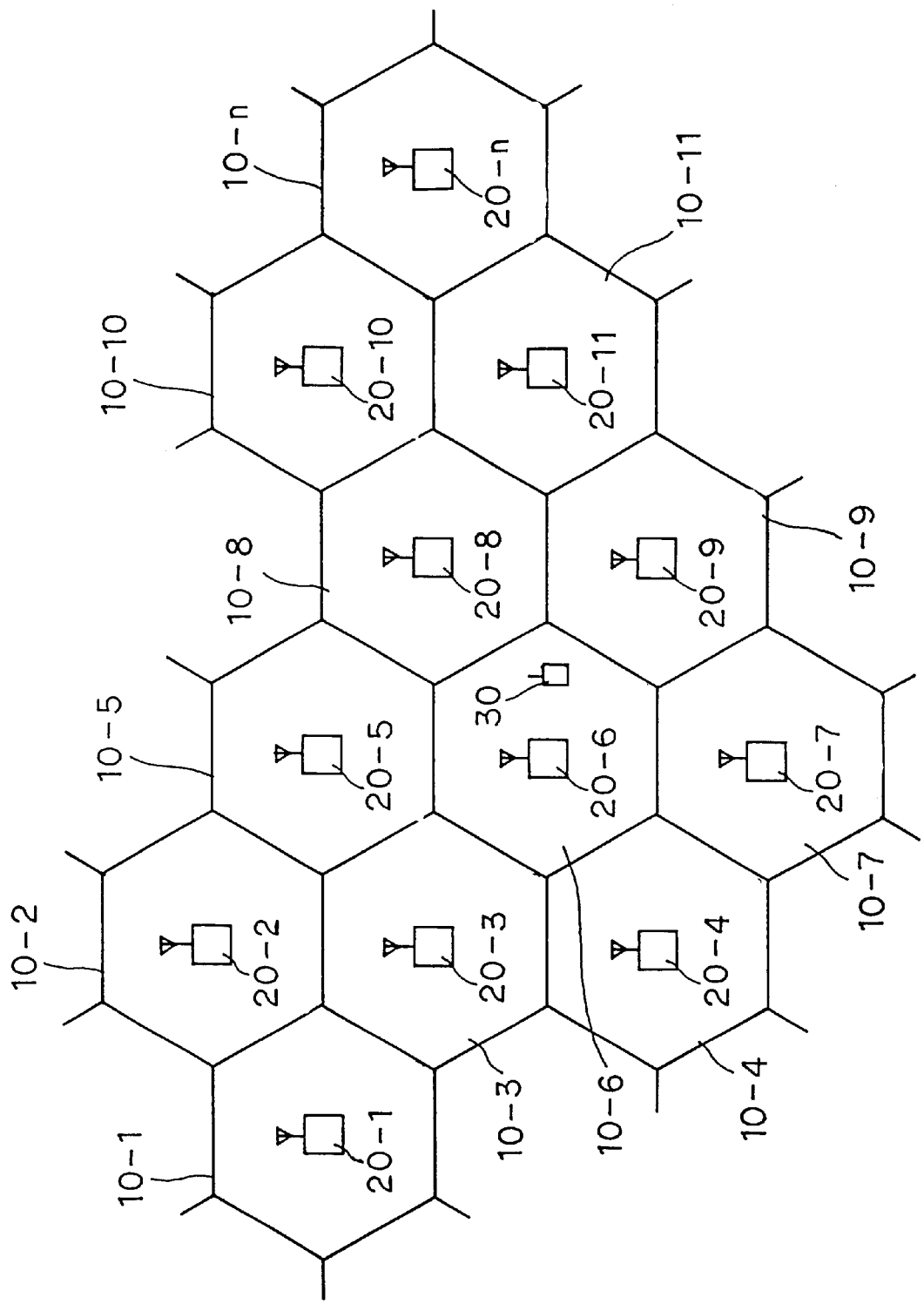
FIG. 1 is a diagram showing a cellular radio-telecommunication network including a mobile radio station of the prevent invention.

As shown in FIG. 1, this network includes radio base stations 20-1~20-n which have cell 10-1~10-n as service area and mobile radio station 30 existing in cell 10-6.

Here, only one mobile radio station is shown in FIG. 1, but a plurality of mobile radio stations exist in the service area.

Figure 2:
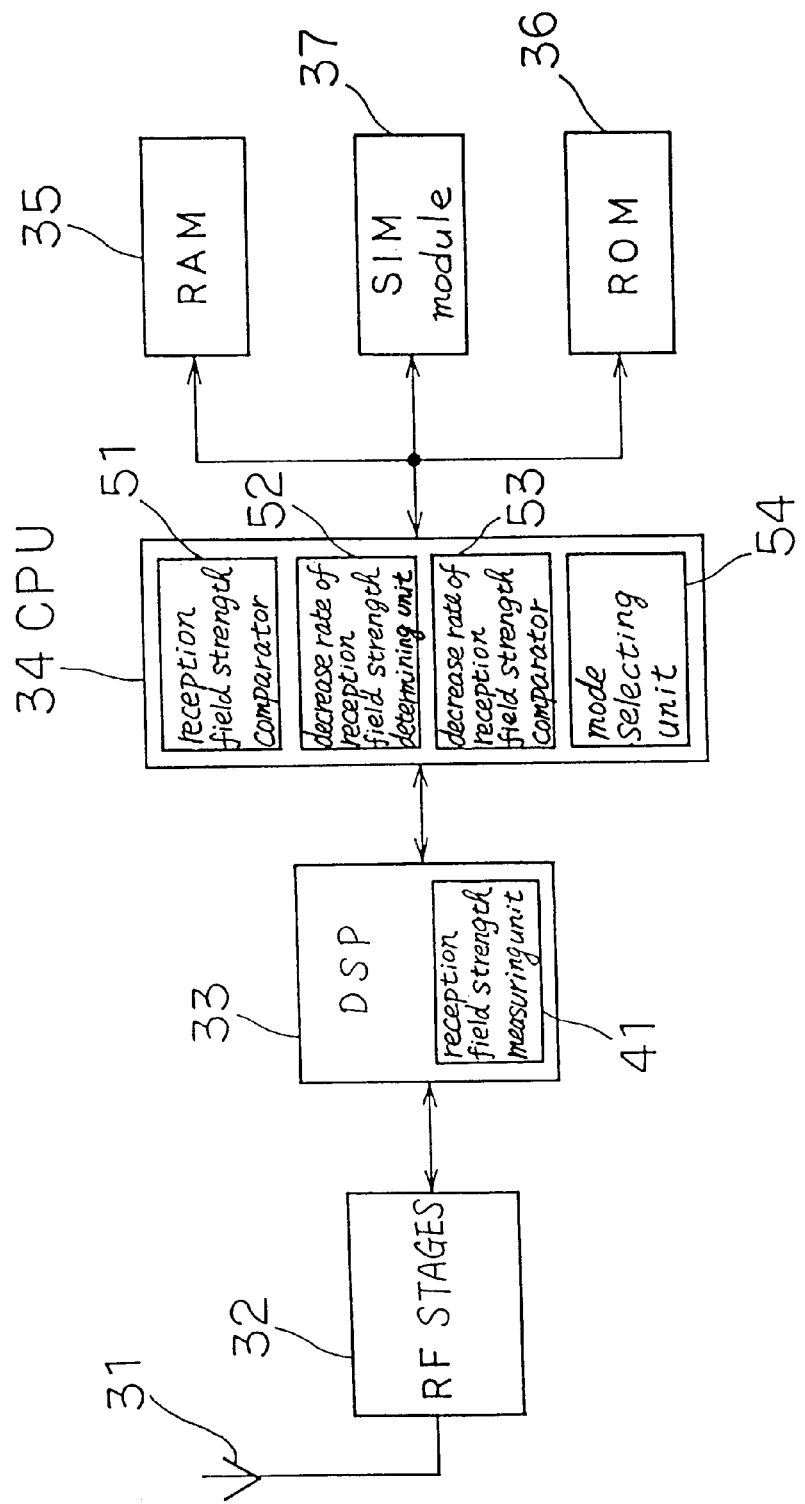
FIG. 2 is a block diagram showing an embodiment of a mobile radio station 30 shown in FIG. 1.

Mobile radio station 30 includes, as shown in FIG. 2, antenna 31 and RF stage 32 which receive data and control signals from radio base stations 20-1~20-n in the network and transmit a signal to the radio base station, digital signal processing (DSP) unit 33 which converts a received signal into a digital signal and stores the digital signal temporarily, CPU 34 which has RAM 35 and ROM 36 and processes the digital signal and receives user instructions from a keypad (not shown), and SIM (Single Instruction Multiple data stream) module 37 which is connected with CPU 34 and communicates with CPU 34 in a known manner. Further, digital signal processing unit 33 is responsible for many of the basic logic operations of mobile radio station 30.

Digital signal processing unit 33 has reception field strength measuring unit 41 which measures a reception field strength of a signal transmitted from the current radio base station and a reception field strength of a signal transmitted from a radio base station neighboring to the current radio base station. Reception field strength measuring unit 41 has two measuring modes of which one measuring mode is set up. One mode is a full monitoring mode which measures the reception field strengths of signals transmitted from a maximum number of previously determined radio base stations from among neighboring radio base stations. The other mode is a reduced monitoring mode which measures the reception field strength of a signal transmitted from a number of radio base stations less than the maximum number from among neighboring radio base stations.

CPU 34 has reception field strength comparator 51 which is means for second comparison and compares the reception field strength of a signal of a current cell measured by reception field strength measuring unit 41 with a first threshold previously determined, decrease rate of reception field strength determining unit 52 which determines the rate of decrease of reception field strength of a current cell from a value measured by reception field strength measuring unit 41, decrease rate of reception field strength comparator 53 which is a means for first comparison and compares the rate of decrease determined by decrease rate of reception field strength determining unit 52 with a second threshold previously determined, and mode selecting unit 54 which selects the mode of reception field strength measuring unit 41 based on the result of decrease rate comparison by reception field strength comparator 53. The CPU 34 maintains a list, known as the BA (BCCH Alocation) list, of neighboring radio base stations Ids, and the frequencies on which their control channels are operating. The BA list is maintained on the basis of data transmitted by the current radio base station.

The CPU 34 also maintains a stored value of the last measured signal strength for each of the radio base stations 20-1~20-n in the BA list.

The current radio base station also provides data identifying the period separating paging channel (PCH) TDMA frames as a number from 2 to 9 representing the period in terms of the number of GSM multiframes which occur in the period. If the number (bs_pa_mfrms) is equal to 2, there will be a PCH frame in alternate multi-frames. If the number is equal to 9, there will be eight multi-frames between the multiframes which include a PCH frame.

Figure 3:
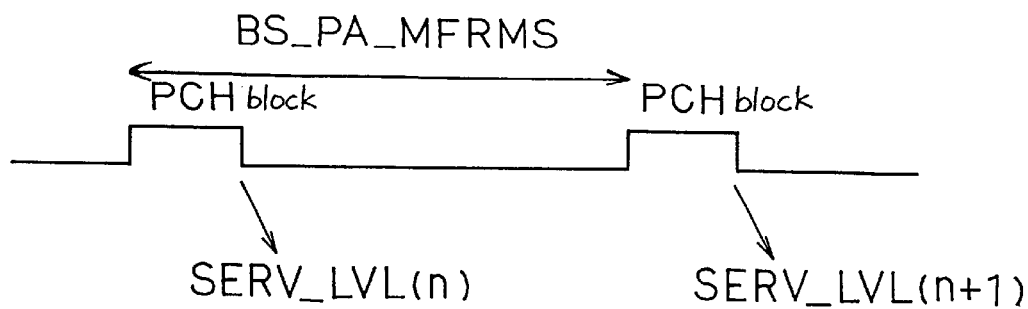
FIG. 3 is a time chart showing how the PCH TDMA frames are separated.

FIG. 3 is a time chart showing how the PCH TDMA frames are separated.

Radio base station 20-1~20-n also provides data identifying the position of the PCH frame in a multi-frame, but this is not pertinent to the present invention and will not be referred to hereinafter.

Conventionally, when mobile radio station 30 is in the idle mode (i.e. no call is connected) digital signal processing unit 33 measures reception field strengths of signals transmitted from the neighboring radio base stations at the rate of two such measurements in every PCH frame.

In this way, the data about the reception field strength of signals transmitted from the neighboring radio base stations is kept as up-to-date as possible, so that, when a hand-off is required, mobile radio station 30 already has all the data it needs to select a new radio base station from the BA list and commence the hand off.

In the arrangement now described, the frequency of measuring the reception field strengths of a signals transmitted from the neighboring radio base-stations is reduced in normal operation so that power used by such measuring is conserved except when a hand-off is judged to be imminently required.

Figure 4:
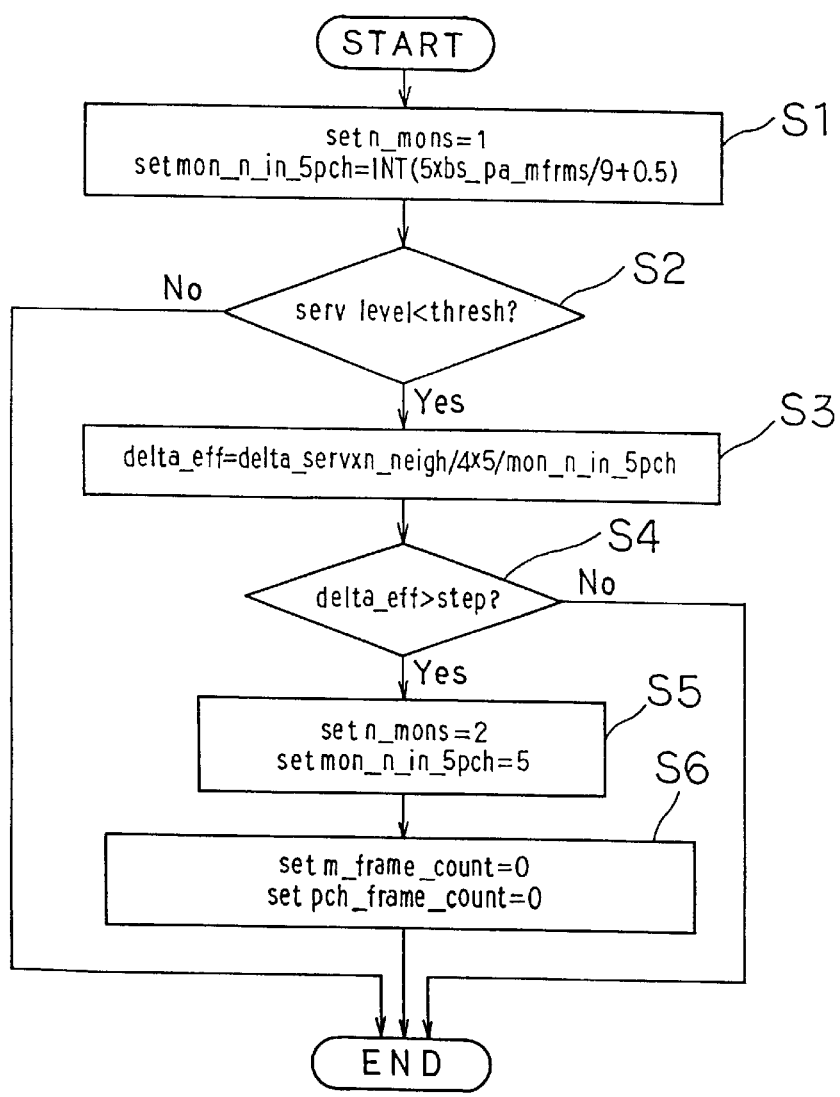
FIG. 4 is a flow chart illustrating operation for determining the frequency of a reception field strength of mobile radio station 30 shown FIG. 2.

FIG. 4 is a flow chart illustrating operation for determining the frequency of a reception field strength of mobile radio station 30 shown FIG. 2.

At the start of this routine, a variable n_mons is set to a value of 1 and a variable mon_n_in_5pch is set to a value determined in accordance with the value of the parameter bs_pa_mfrms previously referred to at step S1.

As shown in FIG. 4 the value of mon_n_in_5pch in set to the integer part of five ninths of bs_pa_mfrms plus 0.5. Thus mon_n_in_5pch will be 1 if bs_pa_mfrms has its minimum value (2), or 5 if bs_pa_mfrms has its maximum value (9) and will vary accordingly between these limits.

Reception field strength comparator 51 compares a reception field strength serv_level of signal transmitted from radio base station of current cell measured by reception field strength measuring unit 41 with a first threshold thresh (for example −90 dbm) previously determined at step S2.

If a reception field strength serv_level is less than the threshold, a value data_eff representing the effective decrease of a reception field strength of the current cell since the measuring the reception field strength is calculated at step S3.

$$\text{Dalta\_eff} = \text{delta\_serve} \times n\_\text{neigh}/4 \times 5/\text{mon\_}n\_\text{in }5pch$$

where delta_serve is the actual decrease in the signal strength since the previous measuring, and n_neigh is the number of radio base stations listed in the BA list.

Decrease rate of reception field strength comparator 53 compares the calculated value of delta_eff with a value step (e.g. 12 db) which represents the maximum acceptable effective decrease in signal between monitors at step S4.

If the value of delta_eff is exceeded the value of n_mons is set to 2 (its maximum value) and the value of mon_n_in_5pch is set to 5 (its maximum value at step S5).

If a reception field strength serv_level is not less than the first threshold at step S2, or if the value of delta_eff does not exceed the value step, the routine terminates.

After that, the value of a multi-frame count and a pch frame count used by the DSP to determine whether monitoring should be carried out in a particular PCH frame are reset at step S6.

Mode selecting unit 54 of CPU 34 uses the variables n_mons and mon_n_in_5pch to select the mode of reception field strength measuring unit 41.

Figure 5:
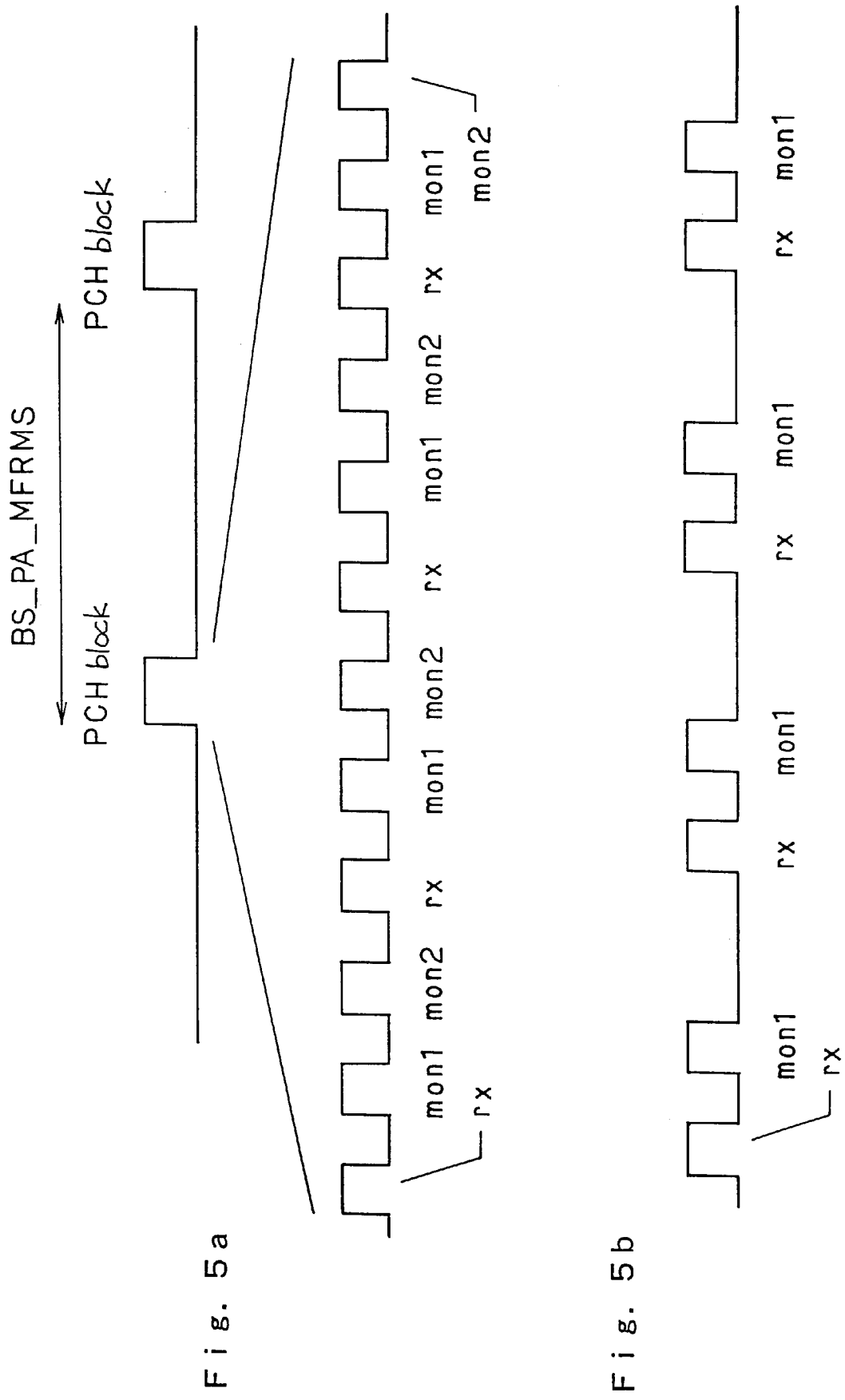
FIG. 5a is a time chart showing how multiple measurements are performed within a single PCH TDMA frame.
FIG. 5b is a time chart showing a PCH TDMA frame when only a single measurement in performed.

FIG. 5a is a time chart showing how multiple measurements are performed within a single PCH TDMA frame. And FIG. 5b is a time chart showing a PCH TDMA frame when only a single measurement in performed.

If n_mon is set to 2, mode selecting unit 54 sets the mode of reception field strength measuring unit 41 for measuring two time within a single PCH frame as shown in FIG. 5a. And if n_mon is set to 1, mode selecting unit 54 sets the mode of reception field strength measuring unit 41 for measuring one time within a single PCH frame as shown FIG. 5b.

Figure 6:
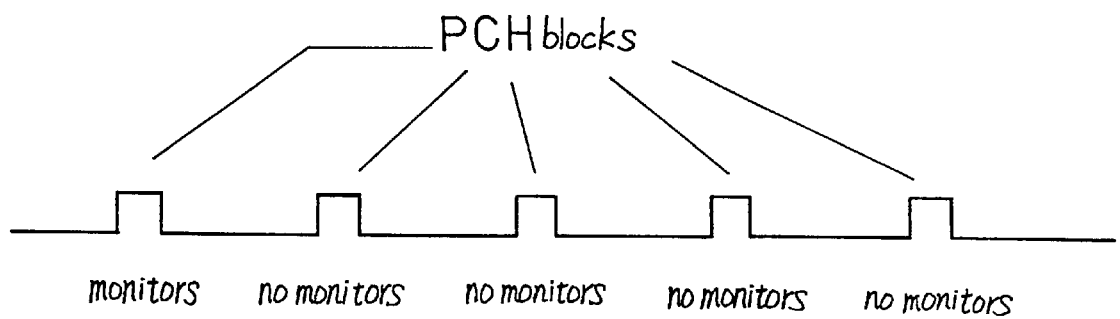
FIG. 6 is a time chart showing how measurements are distributed among available PCH TDMA frames when the mode of reception field strength measuring unit 41 is set to a reduced monitoring mode.

FIG. 6 is a time chart showing how measurements are distributed among available PCH TDMA frames when the mode of reception field strength measuring unit 41 is set to a reduced monitoring mode.

As shown FIG. 6, if the value of mon_n_in_5pch is set to 1, only the first possible PCH slot in each block of five PCH slots is used for measuring a reception field strength. No measurements are performed in the other 4 PCH blocks.

If the value of mon_n_in_5pch is set to 2, the first two frames will be used for measuring a reception field strength and so on up to 5.

The CPU 34 maintains separate counts of multi-frames which it resets periodically to enable it to keep measuring of reception field strengths synchronised. These are the counts which are reset by the CPU 34 when the full monitoring mode is commenced.

In the above embodiment, the value mon_n_in_5pch is set to a value determined in accordance with the value of the parameter bs_pa_mfrms, but mon_n_in_5pch can be derived from a look-up table.

While a preferred embodiment of the present invention has been described using specific terms, such description is for illustrative purposes only, and it is to be understood that changes and variations may be made without departing from the spirit or scope of the following claims.

What is claimed is:

1. A mobile radio station comprising:

a measuring unit, provided with a full monitoring mode which measures reception field strengths of a signal transmitted from a maximum number of previously determined radio base stations from among neighboring radio base stations, and a reduced monitoring mode which measures a reception field strength of a signal transmitted from a number of radio base stations less than said maximum number from among neighboring radio base stations, and periodically measures a reception field strength of a current cell and of signals transmitted from radio base stations neighboring the current cell by one of said two modes;

a determining unit that determines the rate of decrease of the reception field strength of the current cell measured by said measuring unit;

a comparator which compares the rate of decrease determined by said determining unit with a threshold that has been previously determined; and a selecting unit that selects said full monitoring mode of said measuring unit when the rate of decrease of reception field strength of the current cell measured by said measuring unit exceeds said threshold, and selecting said reduced monitoring mode when the rate of decrease of reception field strength of the current cell measured by said measuring unit do not exceed said threshold.

2. A mobile radio station according to claim 1 further comprising;

a rate comparator which compares the reception field strength of the current cell measured by said measuring unit with a second threshold previously determined, wherein said determining unit determines the rate of decrease of reception field strength of the current cell only if the reception field strength of the current cell measured by said measuring unit is less than said second threshold.

3. A mobile radio station according to claim 2, wherein said measuring unit receives an indication of the frequency of time-slots available for measuring said reception field strength from said radio base stations.

4. A mobile radio station according to claim 3, wherein said measuring unit is able to measure reception field strengths of signals transmitted from more than one neighboring radio station in a time-slot.

5. A mobile radio station according to claim 4, wherein said measuring unit measures a maximum number of the reception field strengths in each available TDMA frame in said full monitoring mode.

6. A mobile radio station according to claim 5, wherein said measuring unit measures reception field strengths in a TDMA frame in said reduce monitoring mode.

7. A mobile radio station according to claim 6, wherein said measuring unit measures reception field strengths in the selected available time-slots in said reduced monitoring mode.

8. A mobile radio station according to claim 7, wherein the selection of the number of time-slots for measuring reception field strengths is determined by said indication of the frequency of time-slots available.

9. A mobile radio station according to claim 1, wherein said measuring unit receives an indication of the frequency of time-slots available for measuring said reception field strength from said radio base stations.

10. A mobile radio station according to claim 9, wherein said measuring unit is able to measure reception field strengths of signals transmitted from more than one neighboring radio station in a time-slot.

11. A mobile radio station according to claim 10, wherein said measuring unit measures a maximum number of the reception field strengths in each available TDMA frame in said full monitoring mode.

12. A mobile radio station according to claim 11, wherein said measuring unit measures reception field strengths in a TDMA frame in said reduce monitoring mode.

13. A mobile radio station according to claim 12, wherein said measuring unit measures reception field strengths in the selected available time-slots in said reduce monitoring mode.

14. A mobile radio station according to claim 13, wherein the selection of the number of time-slots for measuring reception field strengths is determined by said indication of the frequency of time-slots available.

15. A method for monitoring a reception field strength of a mobile station, comprising:

initializing a first variable and generating a second variable in accordance with a parameter;

comparing a reception field signal strength of a base station signal of a current cell with a first threshold value;

calculating a third variable when said reception field signal strength is less than said first threshold value, and comparing said third variable with a second threshold value;

setting said first variable and said second variable to maximum values when said third variable exceeds said second threshold value, wherein at least one paging channel (PCH) block is skipped for every PCH block that is measured in a reduced monitoring mode, and a maximum number of said PCH blocks are measured in a full monitoring mode.

16. The method of claim 15, wherein said first variable is initialized to a value of 1, said parameter comprising an integer value between 2 and 9, and said second variable comprising an integer value of 5/6 of said parameter, plus 0.5, such that said second variable varies between 1 and 5.

17. The method of claim 15, wherein said third variable is calculated by multiplying a first product and a second product, wherein said first product comprises a value of a decrease in a signal strength since a previous measurement of said signal strength, multiplied by a value corresponding to the number of listed neighboring stations and divided by 4, and said second product comprises 5 divided by said second variable.

18. The method of claim 15, wherein said second threshold comprises a maximum acceptable decrease in signal strength between monitor period.

19. The method of claim 15, further comprising resetting values of a multi-frame count and a PCH frame count to zero after said setting step.

20. The method of claim 15, wherein said setting step comprises setting said first variable to a value of two and setting said second variable to a value of 5.

21. The method of claim 15, wherein said first variable comprises a number of measurements per frame and said second variable is positioned in a lookup table.

22. The method of claim 15, wherein a reception field strength of signals from at least one neighbor base station is measured twice per PCH frame.

\* \* \* \* \*